United States Patent Office.

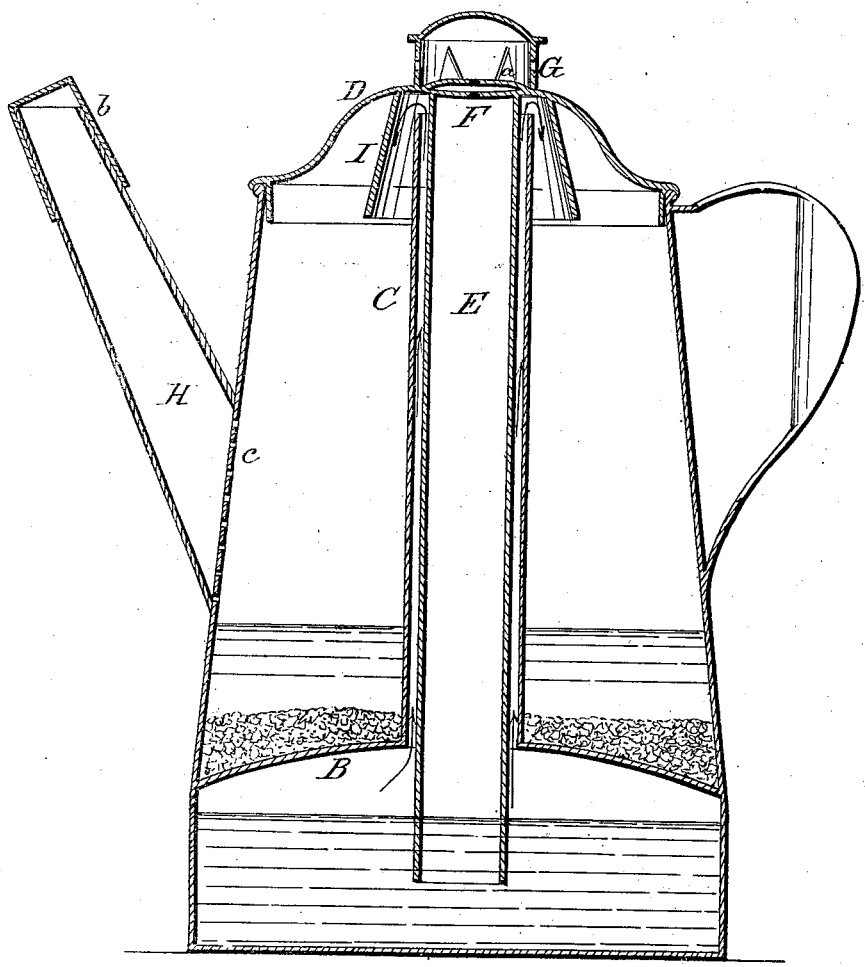

AMASA C. KASSON, OF MILWAUKEE, WISCONSIN, ASSIGNOR TO HIMSELF AND NELSON C. GRIDLEY, OF SAME PLACE.

Letters Patent No. 77,291, dated April 28, 1868.

IMPROVEMENT IN TEA AND COFFEE-POTS.

*The Schedule referred to in these Letters Patent and making part of the same.*

TO ALL WHOM IT MAY CONCERN:

Be it known that I, AMASA C. KASSON, of the city of Milwaukee, in the county of Milwaukee, and State of Wisconsin, have invented certain new and useful Improvements in Coffee and Tea-Pots; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention relates to tea or coffee-pots, and consists in certain new and useful improvements in their construction for increasing their utility, as well as their efficiency in extracting the full strength of the tea or coffee. The drawing—

Figure 1, represents a longitudinal vertical section of my improved pot.

I construct it by placing within or attaching to the body of a common tea or coffee-pot, of any desired size, a false convex bottom, B, at a point distant from the real bottom, about one-third of the height of the same, as shown in the figure. This false bottom, B, I make convex, so that, when the pot is turned upside down, the water or other substance beneath it will run to its centre, and thus render the cleaning of it easy.

In the centre of the false bottom, B, I make a circular hole or opening, and attach to the false bottom B, so as to connect directly with this opening, a vertical tube, C, made sufficiently long to extend a short distance above the body of the pot, but not quite to the under side of the cover D, as shown in the drawing.

In the centre of the cover D, which is convex on its upper surface, being raised in the ordinary way, I make an opening or hole a little smaller than the one in the false bottom B, and attach to the cover, on its under side, so as to connect directly with this opening, a tube, E, of the proper size, to pass loosely within the tube C, and long enough to extend to about half way between the false and real bottoms of the pot, as shown in the drawing.

In the top of the tube C, I insert a whistle, F, made in the form or shape of an ordinary tin whistle, and which, when air or steam from the lower part of the pot shall pass through it, will give out the sound produced by blowing through it, in the common way.

On the upper side of the cover D, and immediately over the upper end of the tube E, I attach a cap, G, with perforations or holes, a, in its sides, to allow the escape of air or steam passing up the tube E and through the whistle F, and also as a cover and protection for the upper end of the tube, as also shown in the drawing.

The spout, H, I provide, at its upper end, with a cover, b, and at its lower end with a screw, c, in the usual manner.

In preparing my pot for use, I pour hot or cold water through the tube C until the lower chamber is nearly filled, or until the water rises to within an inch or two of the top of the tube C, as desired. Within the chamber of the pot, above the false bottom B, I place the tea or coffee, and pour thereon hot water to within one or two inches of the top of the pot. Then put on the cover D, tight, and also the cover, b, of the spout H, and place the pot on the stove or fire, and let it boil for from fifteen to twenty minutes; then take it off, and let it stand for three minutes, and the coffee or tea is ready for use.

As inexperienced, careless, or unskilful parties, in using my coffee-pot, may fill the interior chamber with water till it rises near the top of the main tube, C, so that, in turning the pot up to pour out the tea or coffee, the water will run over the top of the tube C, fall against the cover and "slop over," or work its way out between the cover and the body of the pot, and in order to prevent this, I attach to the under side of the cover D a conical tube or hood, I, large enough to fit loosely over the main tube, C, and long enough to cause the water running over the main tube, C, and striking necessarily against its inner surface, to be carried directly down upon the tea or coffee in the upper chamber. This conical tube will also furnish more surface for condensing the steam rising up the tube C, and will give this steam a downward direction directly upon the tea or coffee being prepared.

By this construction of pot, all of the aroma of the tea or coffee is retained within it. The water within the upper chamber never boils, but is kept hot, and thoroughly extracts the strength of the tea or coffee. The water in the lower chamber is made to boil. The steam rising from it passes up between the tubes C and E, in the direction of the red arrows, and over into the upper part of the pot, and then condenses and adds to the heat, and mingles with the liquid in it.

The steam rising through the tube E, or the air, so long as the water is above the lower end of the tube E, will make a low, simmering sound, but when the water falls below the end of the tube, the steam will operate the whistle F, so as to be distinctly heard, and thus give a prompt alarm of the condition of the water in the lower chamber. This sound will continue for some time, so as to give ample time to remove the pot from the fire or stove, or to fill it up before being injured.

The sound given out by the whistle will thus indicate the height of the water in the lower chamber, and give instant alarm when it becomes so low that there is danger of the pot being injured by the fire.

The advantages of this construction of pot are its simplicity, ease in cleaning the lower chamber, by the use of the convex false bottom, retaining and condensing all the steam, and preserving all the aroma of the tea or coffee within the pot. It never boils over, and hence there is no smell, and no soiling of the stove. It is self-regulating, notifying the cook when more water is needed in the lower chamber to prevent burning.

Having thus described my invention, what I claim, is—

1. A tea or coffee-pot, consisting of an upper chamber for the tea or coffee, and a lower chamber, B, for hot water, with an outer central tube, C, attached, and cover D, with tube E, whistle F, and hood I, all constructed and arranged substantially as described.

2. In combination with the hot-water chamber B and central tube C, I claim the cover D, with hood I and tube E, when constructed and arranged substantially as herein described.

3. I claim the cover D, with the tube E and conical deflecting-tube or hood I, attached substantially as described.

A. C. KASSON.

Witnesses:
N. C. GRIDLEY,
F. W. AVERILL.